(12) United States Patent
Angst et al.

(10) Patent No.: US 9,407,582 B2
(45) Date of Patent: Aug. 2, 2016

(54) REDUNDANTLY OPERABLE INDUSTRIAL COMMUNICATION SYSTEM AND METHOD FOR OPERATION THEREOF

(71) Applicants: Hermann Angst, Karlsruhe (DE); Stefan Keller, Waldbronn (DE); Siegfried Kühnel, Zingst (DE); Henryk Lumpp, Karlsruhe (DE); Martin Schneider, Wendelstein (DE)

(72) Inventors: Hermann Angst, Karlsruhe (DE); Stefan Keller, Waldbronn (DE); Siegfried Kühnel, Zingst (DE); Henryk Lumpp, Karlsruhe (DE); Martin Schneider, Wendelstein (DE)

(73) Assignee: Siemens Aktiengesellschaft, Muenchen (DE)

( * ) Notice: Subject to any disclaimer, the term of this patent is extended or adjusted under 35 U.S.C. 154(b) by 277 days.

(21) Appl. No.: 14/034,095

(22) Filed: Sep. 23, 2013

(65) Prior Publication Data

US 2014/0086136 A1   Mar. 27, 2014

(30) Foreign Application Priority Data

Sep. 24, 2012   (EP) .................................... 12185676

(51) Int. Cl.
| | |
|---|---|
| *H04L 12/861* | (2013.01) |
| *H04L 12/40* | (2006.01) |
| *H04W 24/04* | (2009.01) |
| *H04L 12/707* | (2013.01) |
| *H04L 12/875* | (2013.01) |
| *H04L 12/823* | (2013.01) |

(52) U.S. Cl.
CPC ...... *H04L 49/9089* (2013.01); *H04L 12/40176* (2013.01); *H04L 12/40189* (2013.01); *H04L 45/24* (2013.01); *H04L 47/56* (2013.01); *H04W 24/04* (2013.01); *H04L 47/32* (2013.01); *H04L 2012/4026* (2013.01)

(58) Field of Classification Search
None
See application file for complete search history.

(56) References Cited

U.S. PATENT DOCUMENTS

| | | | |
|---|---|---|---|
| 7,272,298 | B1 * | 9/2007 | Lang et al. .................... 386/291 |
| 2004/0249969 | A1 * | 12/2004 | Price ............................. 709/231 |
| 2009/0234997 | A1 | 9/2009 | Macchi |
| 2010/0262736 | A1 | 10/2010 | Wiesgickl |
| 2011/0116508 | A1 * | 5/2011 | Kirrmann ..................... 370/392 |

(Continued)

FOREIGN PATENT DOCUMENTS

| | | |
|---|---|---|
| EP | 2282452 | 2/2011 |
| EP | 2413538 | 2/2012 |

OTHER PUBLICATIONS

PROFINET Technology and Application, Version Apr. 2009.*

(Continued)

*Primary Examiner* — Anh Ngoc Nguyen
(74) *Attorney, Agent, or Firm* — Cozen O'Connor

(57) ABSTRACT

A redundantly operated industrial communication system includes communication devices that are redundantly linked to an industrial communication network and includes network infrastructure devices associated with the industrial communication network, wherein message transmission occurs wirelessly at least in sections. The industrial communication network contains a plurality of buffer memory units for message elements that are received at a network node by wire and message elements that are to be sent by the network node wirelessly. When a maximum buffer size is exceeded, an oldest message element situated in a respective buffer memory unit is erased. Until the maximum buffer size is exceeded, the oldest message element is selected as the next message element to be sent wirelessly.

20 Claims, 5 Drawing Sheets

(56) References Cited

U.S. PATENT DOCUMENTS

2012/0023452 A1* 1/2012 Li .................................. 715/845
2014/0092872 A1* 4/2014 Rentschler .................... 370/331

OTHER PUBLICATIONS

"Tutorial on Parallel Redundancy Protocol (PRP)", Weibel, Jul. 7, 2011.*

"IEC 62439-3.4 (PRP) Highly Available Automation Networks", kirrmann, Nov. 21, 2011.*

Markus Rentschler et al., "Towards a Reliable Parallel Redundant WLAN Black Channel", Hirschmann Automation & Control GmbH, 72654 Neckartenzlingen, DE, 2012.

* cited by examiner

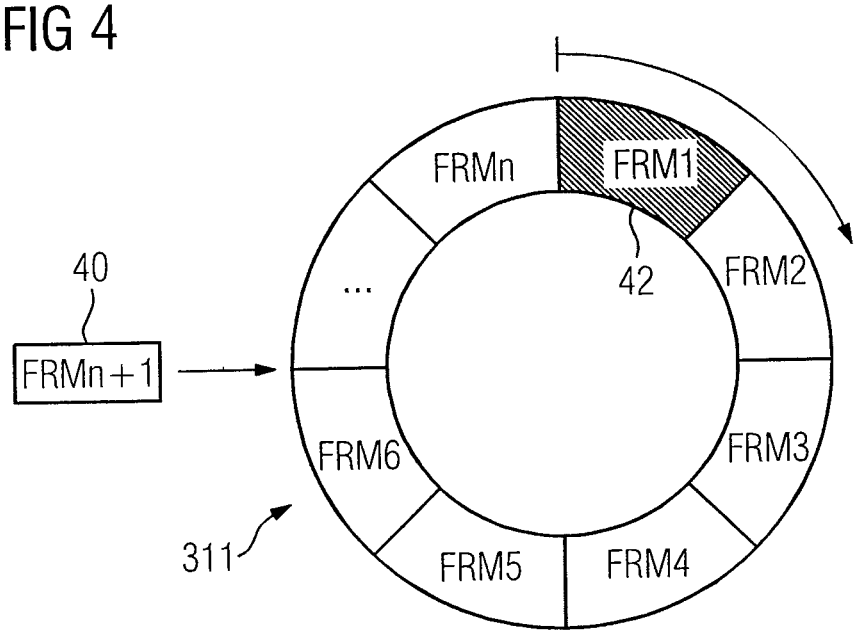
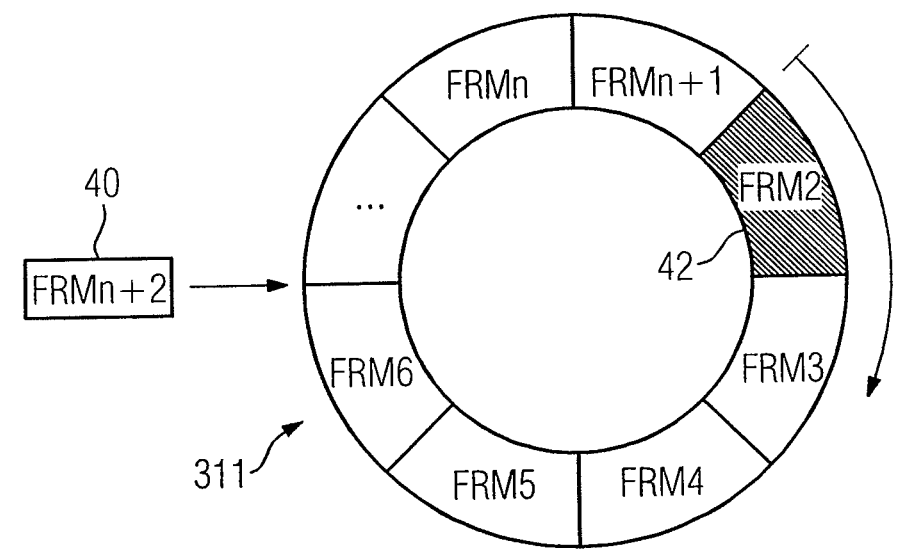

REDUNDANTLY OPERABLE INDUSTRIAL COMMUNICATION SYSTEM AND METHOD FOR OPERATION THEREOF

BACKGROUND OF THE INVENTION

1. Field of the Invention

In distributed industrial automation systems, when measurement and control data are captured, evaluated and transmitted, it is necessary to ensure that complete and unaltered data are available in real time, particularly in the case of time critical an industrial production processes. Typically, industrial automation system comprises a multiplicity of automation devices that are networked to one another by an industrial communication network, and is used within the context of production or process automation to control or regulate installations, machines or devices. Reports that are not transmitted or that are not transmitted completely can prevent an industrial automation system from changing to or remaining in a safe operating state, for example. This can finally result in failure of an entire production installation and in a costly production stoppage. A particular set of problems regularly arises in industrial automation systems from report traffic with comparatively many but relatively short messages, which amplifies the above problems.

2. Description of the Related Art

In order to be able to compensate for failures in communication links or devices, communication protocols, such as media redundancy protocol, high-availability seamless redundancy or parallel redundancy protocol, have been developed for high-availability, redundantly operable in industrial communication networks. Media redundancy protocol (MSR) is defined in the International Electrotechnical Commission (IEC) 62439 standard and allows compensation for individual connection failures in networks with a simple ring topology in the event of bursty redundant transmission of messages.

Based on media redundancy protocol, a switch having two ports within the ring topology has an associated redundancy manager that monitors the network for connection failures and initiates a switching measure for ring closure if necessary. In the normal operating state, the redundancy manager uses test messages to check whether an interruption has occurred within the ring topology. However, the switch associated with the redundancy manager does not normally forward messages containing useful data from one port to the other port. This prevents messages that contain useful data from circulating constantly within the ring topology. If a switch or a connection fails within the ring topology, test messages emitted by a port are no longer received at the respective other port. From this, the redundancy manager can recognize a failure and, in the event of a failure, the redundancy manager forwards messages containing useful data from one port to the other port and vice versa, unlike in the normal operating state. Furthermore, the redundancy manager prompts the remainder of the switches to be notified about a failure-dependent topology change. This prevents messages from being transmitted via the failed connection.

Bursty media redundancy methods can be implemented with relatively little complexity in principle. However, it is disadvantageous that firstly messages can be lost in the case of error and secondly there is initially a fault state during reconfiguration of a communication network. Such a fault state needs to be backed up by a superimposed communication protocol, for example, by Transmission Control Protocol/Internet Protocol (TCP/IP) at network or transport layer level, in order to prevent an interruption in a communication link.

PROFINET (IEC 61158 Type 10) also refers to media redundancy protocol as a bursty media redundancy method within a communication network with a ring topology. By contrast, media redundancy planned duplication (MRPD) provides an extension for smooth transmission of isochronous realtime data. Media redundancy planned duplication is not an application-neutral smooth media redundancy method, however, but rather a PROFINET-specific extension.

High-availability seamless redundancy (HSR) and parallel redundancy protocol (PRP) are defined in the IEC 62439-3 standard and allow smooth redundant transmission of messages with extremely short recovery times. Based on high-availability seamless redundancy and parallel redundancy protocol, each message is duplicated by a sending communication device and is sent to a receiver in two different ways. A receiver-end communication device filters out redundant messages that are duplicates from a received data stream.

EP 2 282 452 A1 describes a method for data transmission within a ring-like communication network, in which the data transmission occurs based on high-availability seamless redundancy and the communication network comprises at least a master node, a source node and a destination node. Each node has a first and a second communication interface with a respective first and second neighboring node. Furthermore, each node receives data frames via the first communication interface and forwards the received data frame in either altered or unaltered form via the second communication interface without additional delay. The master node sends a first and a second redundant data frame or an empty data frame to its first or second neighboring node. When the two redundant data frames are received, the source node fills the respective data frame in a predetermined reserved area with process data. Next, each filled data frame is immediately and individually forwarded to the first or second neighboring node of the source node. Finally, the destination node extracts the process data from the first received filled data frame in a pair of redundant data frames.

EP 2 413 538 A1 discloses a method for redundant communication in a communication system that comprises a plurality of communication networks. The communication networks are connected to one another by at least one coupling node. Transmission of data that come from a first communication network back to the first communication network from a second communication network is prevented based on a segment of information that is defined prior to data transmission.

The IEC 62439-3 standard prescribes hitherto exclusively wired transmission links for the parallel redundancy protocol (PRP) based on comparatively long latency delays in wireless communication systems and a resultant nondeterministic transmission response. "Towards a Reliable Parallel Redundant WLAN Black Channel", Markus Rentschler, Per Laukemann, Institute of Electrical and Electronic Engineers (IEEE) 2012, examines suitability of WLAN transmission links in PRP communication networks. Parallel application of various diversity techniques for space, time and frequency, for example, can be used to compensate adequately for effects of stochastic channel fading in WLAN communication networks.

SUMMARY OF THE INVENTION

It is an object of the present invention to provide a redundantly operable communication system having wireless transmission links that is suitable for use in industrial automation systems, and also specifying components for such a communication system and a method for operation thereof.

These and other objects and advantages are achieved in accordance with the invention by a network node and communication system which comprises a plurality of communication devices that are redundantly linked to an industrial communication network and that each have at least a first and a second transmission and reception unit. Messages that are to be transmitted redundantly are preferably transmitted based on high-availability seamless redundancy or based on parallel redundancy protocol. Both transmission and reception units each have an interface for a network connection in the industrial communication network and also an identical network address. The first and second transmission and reception units have a connected signal processing unit that has a multiplexer unit for forwarding messages that are to be sent to both transmission units in parallel and a redundancy handling unit for processing messages received from both reception units. The signal processing unit of a redundantly linked communication device may be implemented by a field programmable gate array, for example. The redundancy handling unit comprises a filter unit that is configured to detect received redundant messages.

Furthermore, the communication system in accordance with the invention has a plurality of network infrastructure devices that are associated with the industrial communication network and that each have a plurality of transmission and reception units and a coupling element that connects the transmission and reception units of a network infrastructure device to one another. By way of example, the coupling element of a network infrastructure device may be a high speed bus or a backplane switch with an associated controller. The industrial communication network comprises a plurality of transmission and reception stations for wireless message transmission. By way of example, first and second transmission and reception stations may be provided, where first transmission and reception stations are base stations and second transmission and reception stations are wireless communication devices that can be connected to a base station.

Moreover, the industrial communication network comprises, in accordance with the invention, a plurality of buffer memory units for message elements that are received at a network node by wire and message elements that are to be sent by the network node wirelessly. By way of example, a buffer memory unit may be associated with a network infrastructure device, a transmission and reception station for wireless message transmission, and preferably comprises a ring buffer. In addition, the buffer memory units each have a maximum buffer size and are configured such that, when the maximum buffer size is exceeded, an oldest message element situated in the respective buffer memory unit is erased from the buffer memory unit. By way of example, the oldest message element corresponds to the message element that is inserted into the buffer memory unit first among all the message elements situated in the respective buffer memory unit.

In addition, the buffer memory units are, in accordance with the invention, each configured such that, until the maximum buffer size is exceeded, the oldest message element is selected as the next message element to be sent wirelessly. In this way, it is possible to avoid inadmissibly high latencies in a redundantly operable industrial communication system even when wireless transmission links are used.

In accordance with one particularly preferred embodiment of the communication system according to the invention, the buffer memory units are configured such that a message element is erased from the respective buffer memory unit when a prescribed admissible age is exceeded. This contributes to a further reduction in latencies.

Mutually redundant messages are preferably denoted by a uniform sequence number, where the signal processing unit of a redundantly linked communication device is advantageously configured to allocate a sequence number to a message that is to be transmitted redundantly. Furthermore, the signal processing unit may have an associated memory unit that configured to store sequence numbers from messages that have already been received without error. In this case, the redundancy handling unit is preferably configured to check for an already stored sequence number when a new message is received. This allows particularly efficient handling of redundant messages.

It is also an object of the invention to provide a network node for the above-described redundantly operable industrial communication system that comprises at least a reception unit for receiving redundant messages transmitted by wire and at least a transmission unit for sending redundant messages that are to be transmitted wirelessly. Furthermore, a buffer memory unit connected to the reception unit and to the transmission unit is provided for message elements that are received by wire and message elements that are to be sent wirelessly. The buffer memory unit has a maximum buffer size and is configured such that, when the maximum buffer size is exceeded, an oldest message element situated in the respective buffer memory unit is erased from the buffer memory unit. Furthermore, the buffer memory unit is configured such that, until the maximum buffer size is exceeded, the oldest message element is selected as the next message element to be sent wirelessly. By way of example, the network node in accordance with the invention may comprise a network infrastructure device, such as a switch, a hub, a router or a bridge, a wireless base station, such as a WLAN access point, or a wireless communication device, such as a mobile WLAN client and, in interaction with other network nodes of a corresponding configuration, allows effective limiting of latencies when using wireless transmission links in PRP or HSR communication networks.

It is also an object of the invention to provide a method for the redundant operation of an industrial communication system, where a plurality of communication devices is redundantly linked to an industrial communication network. Here, the communication devices each have at least a first and a second transmission and reception unit, each of which comprises an interface for a network connection in the industrial communication network. Both transmission and reception units have an identical network address. Furthermore, the communication devices each comprise a signal processing unit that is connected to the first and second transmission and reception units, which forwards messages that are to be sent to both transmission units in parallel and that detects redundant messages received from the reception units. Messages to be transmitted redundantly are preferably transmitted based on high-availability seamless redundancy or based on parallel redundancy protocol.

It is also an object of the invention to provide a plurality of network infrastructure devices that are associated with the industrial communication network and that each comprise a plurality of transmission and reception units and a coupling element that connects the transmission and reception units of a network infrastructure device to one another. In the industrial communication network, message transmission occurs wirelessly at least in sections via a plurality of transmission and reception stations. Furthermore, the industrial communication network comprises a plurality of buffer memory units for message elements received at a network node by wire and message elements that are to be sent by the latter wirelessly. The buffer memory units each have a maximum buffer size. When the maximum buffer size is exceeded, in accordance with the invention an oldest message element situated in the respective buffer memory unit is erased from the buffer memory unit. The oldest message element preferably corresponds to that message element that has been inserted into the buffer memory unit first among all the message elements situated in the respective buffer memory unit. Until the maximum buffer size is exceeded, the oldest message element is selected as the next message element to be sent wirelessly. In this way, it is possible to avoid inadmissibly high latencies particularly in PRP and HSR communication networks.

In addition to measures or method steps that are described above, it is possible for media access protocols, particularly those used at data link level (layer 2 based on the Open Systems Interconnection (OSI) reference model), such as Carrier Sense Multiple Access/Collision Avoidance (CSMA/CA), to be altered such that a telegram to be sent is rejected after just a short retry time. Furthermore, delay differences can also be limited by using the industrial point coordination function (iPCF) protocol. For increased tolerance toward delay differences, it is also possible to enlarge a length of sequence numbers for mutually redundant messages. In accordance with a preferred embodiment of the method in accordance with the invention, mutually redundant messages are denoted by a uniform sequence number. By way of example, the signal processing unit of a redundantly linked communication device allocates a sequence number to a message that is to be transmitted redundantly. In accordance with a further embodiment of the method in accordance with the invention, the signal processing unit has an associated memory unit that stores sequence numbers from messages that have already been received without error. Here, the redundancy handling unit advantageously checks a received new message for an already stored sequence number.

Furthermore, a configuration for wireless network components can advantageously be adjusted such that a PRP or HSR telegram is admitted based on a maximum possible telegram length. A further limitation for the latencies arises in accordance with a further embodiment of the method in accordance with the invention when a message element is erased from the respective buffer memory unit when a prescribed admissible age is exceeded.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which:

FIGS. 2-6 show a schematic illustration of a ring buffer at a network node for the communication system shown in FIG. 1 in different filled states.

DETAILED DESCRIPTION OF THE PREFERRED EMBODIMENTS

Figure 1:
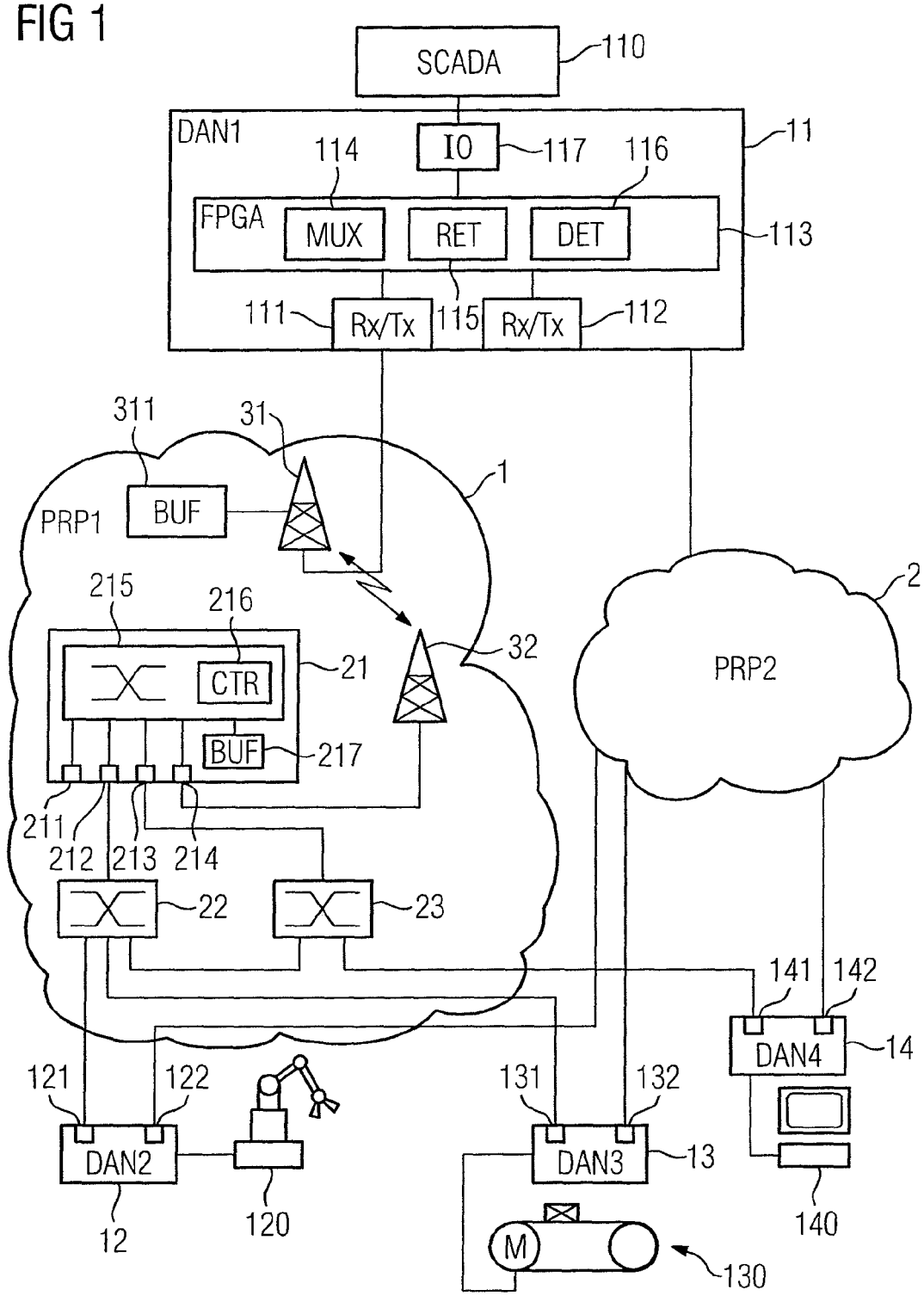
FIG. 1 shows a redundantly operable industrial communication system with a plurality of communication devices that are redundantly linked to an industrial communication network.

The industrial communication system shown in FIG. 1 comprises a plurality of communication devices 11, 12, 13, 14 that are redundantly linked to two network portions 1, 2 and that, in the present exemplary embodiment, are of identical design. By way of example, a redundantly linked communication device 11 that may be associated with a supervisory control and data acquisition (SCADA) system 110 and is connected thereto by an interlink port 117 is shown in more detail. The remainder of the redundantly linked communication devices 12, 13, 14 in the present exemplary embodiment are associated at field level with sensor and actuator systems of an industrial automation system, such as a production robot 120, a drive unit 130 for a conveyor system or an operating and observation station 140 on a production line.

The redundantly linked communication devices 11, 12, 13, 14 each have a first and a second transmission and reception unit 111, 112, 121, 122, 131, 132, 141, 142, each of which comprises an interface for a network connection to one of the two redundant network portions 1, 2. In this case, both transmission and reception units 111, 112, 121, 122, 131, 132, 141, 142 of the redundantly linked communication devices 11, 12, 13, 14 have an identical IP address.

In the case of the exemplary illustrated communication device 11, the first and second transmission and reception units 111, 112 have a signal processing unit 113 connected to them that is implemented via a field programmable gate array and that comprises a multiplexer unit 114 for forwarding massages that are to be sent to both transmission units 111, 112 in parallel. Furthermore, for the purpose of processing messages received from both reception units 111, 112, a redundancy handling unit 115 is provided that comprises a filter unit 116 for detecting received redundant messages. In the present exemplary embodiment, messages that are to be transmitted redundantly are transmitted based on a parallel redundancy protocol. In principle, transmission based on high-availability seamless redundancy is also possible. The explanations below apply to this in a similar fashion.

Mutually redundant messages are denoted by a uniform sequence number. In this case, the signal processing unit of a redundantly linked communication device 11, 12, 13, 14 allocates a sequence number to a message that is to be transmitted redundantly. Furthermore, the signal processing unit has an associated memory unit that stores sequence numbers from messages that have already been received without error. On this basis, the redundancy handling unit checks a received new message for an already stored sequence number to detect received redundant messages.

The two redundant network portions 1, 2 each comprise a plurality of associated network infrastructure devices 21, 22, 23, in the present exemplary embodiment bridges or switches. This is shown in more detail by way of example in FIG. 1 for the network portion 1. The network infrastructure devices 21, 22, 23 each comprise a plurality of transmission and reception units 211, 212, 213, 214 and a coupling element 215 that connects the transmission and reception units 211, 212, 213, 214 to one another. For reasons of clarity, FIG. 1 shows this explicitly only for the network infrastructure device 21, but it also applies to the other two network infrastructure devices 22, 23. In the present exemplary embodiment, the coupling element 215 of the network infrastructure device 21 is implemented by a backplane switch with an associated controller 216.

Along a transmission link in the network portion 1, messages are interchanged between two radio stations 31, 32 wirelessly on a WLAN basis as shown in FIG. 1. In this case, the network infrastructure device 21 and the radio station 32 are associated with a network node. The network infrastructure device 21 and the radio station 31 each have an associated buffer memory unit 217, 311 for message elements received at a network node by wire and message elements that are to be sent by the latter wirelessly. These buffer memory units 217, 311 preferably comprise ring buffers and each have a prescribed maximum buffer size.

Figure 2:
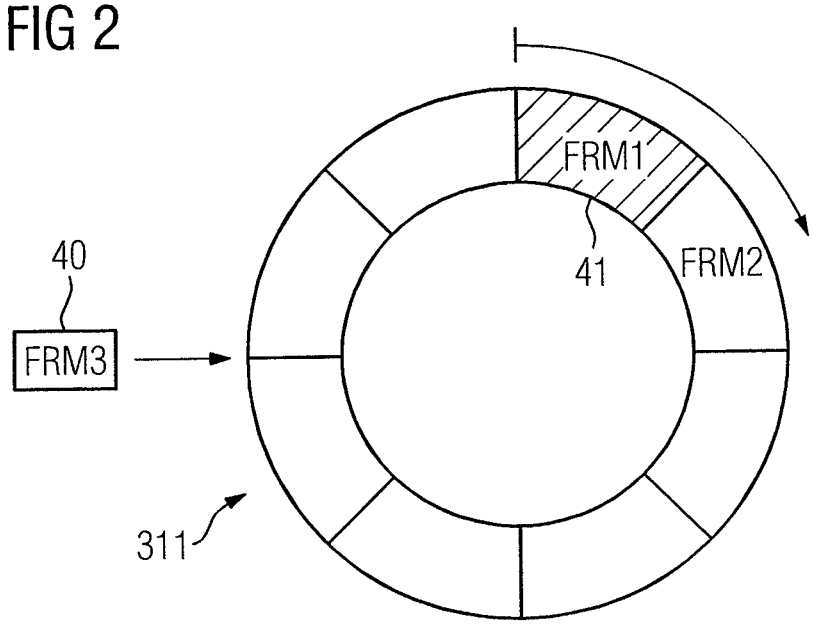
Figure 3:
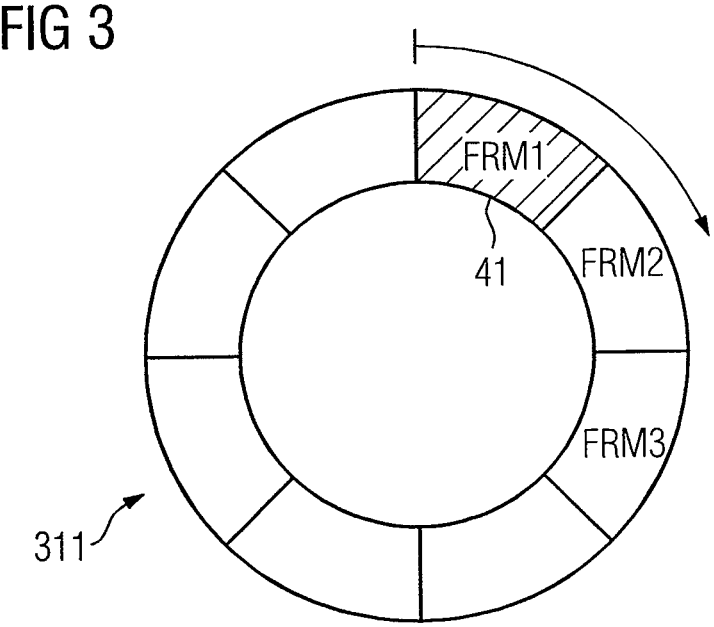

FIGS. 2 and 3 show, by way of example for the buffer memory unit 311, that until the maximum buffer size is exceeded a respective oldest data frame FRM1 is selected as the next data frame 41 to be sent wirelessly. This also applies after the data frame FRM3 is received as the most recent wired transmitted data frame 40. In FIGS. 2 and 3, the respective data frame 41 to be sent wirelessly next is shown in hatched form. The oldest data frame FRM1 corresponds to the data frame that is inserted into the buffer memory unit 311 first among all the data frames FRM1, FRM2, FRM3 situated in the buffer memory unit 311.

Figure 6:
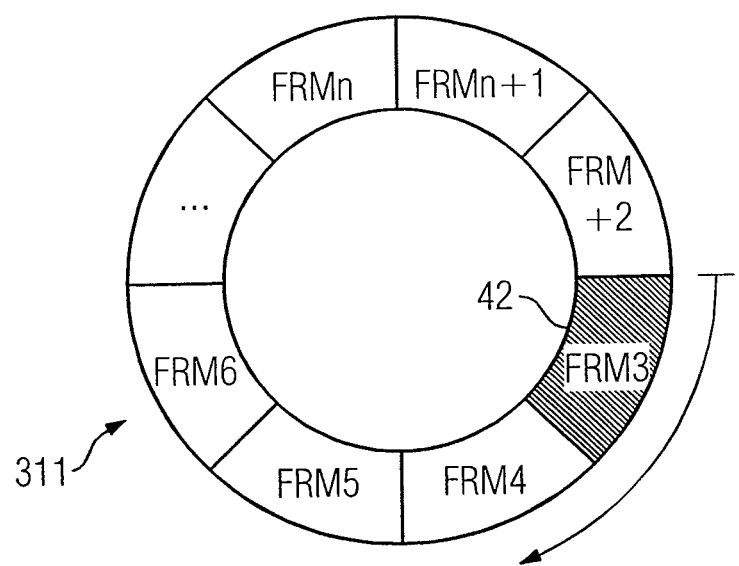

As shown in FIGS. 4 to 6, the respective oldest data frame FRM1, FRM2 situated in the buffer memory unit 311 is erased from the buffer memory unit 311 when the maximum buffer size (n) is exceeded after reception of the data frames FRMn+1, FRMn+2 as the most recent wired transmitted data frames 40. In FIGS. 4 to 6, the respective data frame 42 to be erased next is shown in closely hatched form. Prior to reception of data frame FRMn+1, i.e., following reception of data frame FRMn, this is data frame FRM1 (see FIG. 4). Following reception of data frame FRMn+1, this is data frame FRM2 (see FIG. 5), and following reception of data frame FRMn+1, this is data frame FRM3 (see FIG. 6). In addition to the ring buffer mechanism described, which differs from a First-in-First-Out (FIFO) mechanism, in accordance with a preferred embodiment, a data frame is erased from the respective buffer memory unit when a prescribed admissible age is exceeded.

Features of the exemplary embodiments described above may be implemented either individually or in the described combination with one another.

Figure 7:
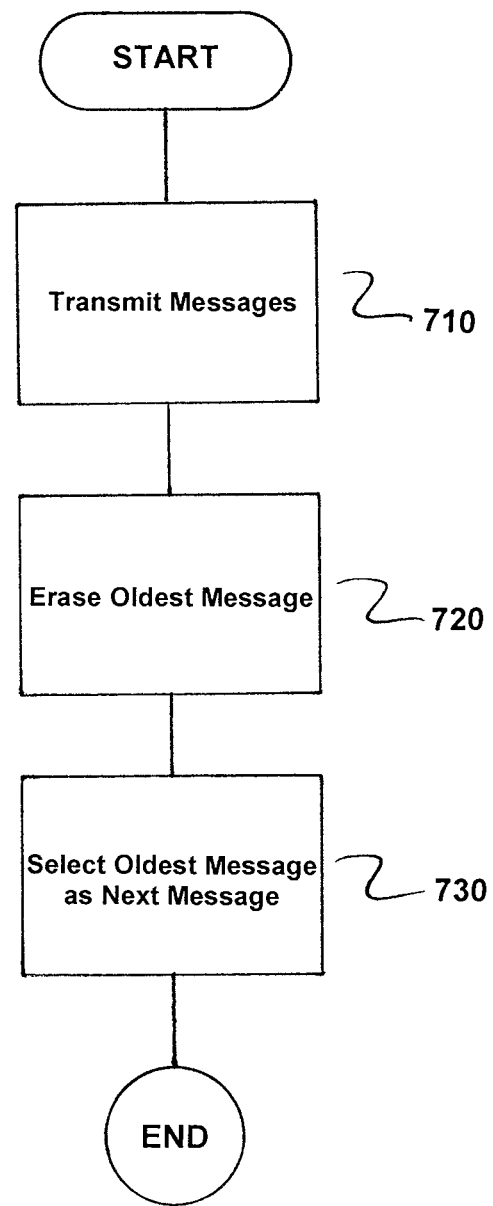
FIG. 7 is a flowchart of the method in accordance with the invention.

FIG. 7 is a flow chart of a method for the redundant operation of an industrial communication system, in which a plurality of communication devices are redundantly linked to an industrial communication network, where the communication devices each comprise at least a first and a second transmission and reception unit, each of which includes an interface for a network connection in the industrial communication network, where the first and second transmission and reception units including an identical network address and a signal processing unit connected to the first and second transmission and reception units, which forwards messages to be sent to both transmission units in parallel and that detects redundant messages received from the reception units, a plurality of network infrastructure devices associated with the industrial communication network each comprising a plurality of transmission and reception units and a coupling element that connects the transmission and reception units of a network infrastructure device to one another.

The method comprises transmitting messages in the industrial communication network wirelessly at least in sections via a plurality of transmission and reception stations, as indicted in step 710. Here, the industrial communication network comprises a plurality of buffer memory units for message elements received at a network node by wire and message elements that are to be sent by the latter wirelessly, and the buffer memory units each have a maximum buffer size.

Next, an oldest message element situated in a respective buffer memory unit is erased from the respective buffer memory unit when the maximum buffer size is exceeded, as indicted in step 720.

The oldest message element is then selected as the next message element to be sent wirelessly until the maximum buffer size is exceeded, as indicated in step 730.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A redundantly operable industrial communication system comprising:
   a plurality of communication devices that are redundantly linked to an industrial communication network, each the plurality of communication devices including:
     at least a first and a second transmission and reception unit, each of the first and second transmission and reception units having an interface for a network connection in the industrial communication network, the first and second transmission and reception units having an identical network address;
     a signal processing unit connected to the first and second transmission and reception units and having a multiplexer unit for forwarding messages to be sent to the first and second transmission units in parallel and a redundancy handling unit for processing messages received from the first and second reception units, the redundancy handling unit comprising a filter unit configured to detect received redundant messages; and
   a plurality of network infrastructure devices that are associated with the industrial communication network, each of the plurality of network infrastructure devices including:
     a plurality of transmission and reception units, and
     a coupling element connecting the transmission and reception units of a network infrastructure device to one another;
   wherein the industrial communication network comprises:
     a plurality of transmission and reception stations for wireless message transmission, and
     a plurality of buffer memory units for message elements which are received by wire at a network node based on at least one of (i) high availability seamless redundancy and (ii) a parallel redundancy protocol, and which are sent wirelessly by the network node;
   wherein the buffer memory units each have a maximum buffer size and are configured such that, when the maximum buffer size is exceeded, an oldest message element situated in a respective buffer memory unit is erased from the respective buffer memory unit, and that, until the maximum buffer size is exceeded, the oldest message element is selected as a next message element to be sent wirelessly.

2. The communication system as claimed in claim 1, wherein the buffer memory units comprise ring buffers.

3. The communication system as claimed in claim 1, wherein the oldest message element corresponds to a message element that is inserted into the buffer memory unit first among all message elements situated in the respective buffer memory unit.

4. The communication system as claimed in claim 2, wherein the oldest message element corresponds to a message element that is inserted into the buffer memory unit first among all message elements situated in the respective buffer memory unit.

5. The communication system as claimed in claim 1, wherein each of the plurality of buffer memory units is configured such that a message element is erased from the respective buffer memory unit when a prescribed admissible age is exceeded.

6. The communication system as claimed in claim 1, wherein mutually redundant messages are denoted by a uniform sequence number; and wherein a signal processing unit of a redundantly linked communication device is configured to allocate a sequence number to a message that is to be transmitted redundantly.

7. The communication system as claimed in claim 6, wherein the signal processing unit includes an associated memory unit which is configured to store sequence numbers from messages that have already been received without error; and wherein the redundancy handling unit is configured to check for an already stored sequence number when a new message is received.

8. The communication system as claimed in claim 6, wherein the signal processing unit of the redundantly linked communication device is implemented via a field programmable gate array.

9. The communication system as claimed in claim 1, wherein a coupling element of a network infrastructure device comprises at least one of (i) a high speed bus and (ii) a backplane switch with an associated controller.

10. The communication system as claimed in claim 1, wherein messages which are to be transmitted redundantly are transmitted based on at least one of (i) high-availability seamless redundancy and (ii) a parallel redundancy protocol.

11. The communication system as claimed in claim 1, wherein a buffer memory unit is associated with one of (i) a network infrastructure device or (ii) a transmission and reception station for wireless message transmission.

12. The communication system as claimed in claim 1, wherein the industrial communication network comprises first and second transmission and reception stations for wireless message transmission; wherein the first transmission and reception stations comprises base stations, and wherein the second transmission and reception stations comprise wireless communication devices that can be connected to a base station.

13. A network node for a redundantly operable industrial communication system, comprising:
at least one reception unit for receiving redundant messages transmitted by wire;
at least one transmission unit for sending redundant messages which are to be transmitted wirelessly;
a buffer memory unit, connected to the reception unit and the transmission unit, for message elements received by wire based on at least one of (i) high availability seamless redundancy and (ii) a parallel redundancy protocol, and for message elements which are sent wirelessly, the buffer memory unit having a maximum buffer size and being configured such that, when the maximum buffer size is exceeded, an oldest message element situated in a respective buffer memory unit is erased from the buffer memory unit, and such that, until the maximum buffer size is exceeded, the oldest message element is selected as a next message element to be sent wirelessly.

14. A method for the redundant operation of an industrial communication system, in which a plurality of communication devices are redundantly linked to an industrial communication network, the communication devices each comprising at least a first and a second transmission and reception unit, each of which includes an interface for a network connection in the industrial communication network, the first and second transmission and reception units including an identical network address and a signal processing unit connected to the first and second transmission and reception units, which forwards messages to be sent to both transmission units in parallel and that detects redundant messages received from the reception units, a plurality of network infrastructure devices associated with the industrial communication network each comprising a plurality of transmission and reception units and a coupling element that connects the transmission and reception units of a network infrastructure device to one another, the method comprising:
transmitting messages in the industrial communication network wirelessly at least in sections via a plurality of transmission and reception stations, the industrial communication network comprising a plurality of buffer memory units for message elements received by wire at a network node based on at least one of (i) high availability seamless redundancy and (ii) a parallel redundancy protocol, and message elements which are sent wirelessly by the network node, and the buffer memory units each having a maximum buffer size;
erasing from a respective buffer memory unit an oldest message element situated in the respective buffer memory unit when the maximum buffer size is exceeded; and
selecting the oldest message element as the next message element to be sent wirelessly until the maximum buffer size is exceeded.

15. The method as claimed in claim 14, wherein the oldest message element corresponds to a message element that is inserted into the buffer memory unit first among all message elements situated in the respective buffer memory unit.

16. The method as claimed in claim 14, wherein a message element is erased from the respective buffer memory unit when a prescribed admissible age is exceeded.

17. The method as claimed in claim 15, wherein a message element is erased from the respective buffer memory unit when a prescribed admissible age is exceeded.

18. The method as claimed in claim 14, wherein mutually redundant messages are denoted by a uniform sequence number, and wherein a signal processing unit of a redundantly linked communication device allocates a sequence number to a message that is to be transmitted redundantly.

19. The method as claimed in claim 18, wherein the signal processing unit includes an associated memory unit that stores sequence numbers from messages that have already been received without error, and wherein the redundancy handling unit checks a received new message for an already stored sequence number.

20. The method as claimed in claims 13, wherein messages that are to be transmitted redundantly are transmitted based on at least one of (i) high-availability seamless redundancy and (ii) a parallel redundancy protocol.

* * * * *